July 22, 1941.  R. C. UPTON  2,249,993

APPARATUS FOR CONTROLLING THE TEMPERATURE OF FLUID BATHS

Filed May 1, 1939

INVENTOR.
RICHARD C. UPTON
BY
ATTORNEYS

Patented July 22, 1941

2,249,993

UNITED STATES PATENT OFFICE 2,249,993

APPARATUS FOR CONTROLLING THE TEMPERATURE OF FLUID BATHS

Richard C. Upton, Mount Clemens, Mich., assignor of one-half to Commerce Pattern Foundry & Machine Company, Detroit, Mich., a corporation of Michigan Application May 1, 1939, Serial No. 271,129

2 Claims. (Cl. 13—24)

The invention relates to improvements in the control of the temperature of internally electrically heated fluid baths and more particularly molten salt baths used in metallurgical processes, such as the heat treating of steel and other metals.

It is one of the objects of the invention to minimize variations in temperature of the bath due either to variations in potential of the electrical energy supplying means, or to variations in electrical conductivity of the bath, or to variations in heat losses.

It is a further object to provide means for anticipating changes in electrical input required to compensate for the insertion of work into the bath, or its removal therefrom, so as to minimize temperature fluctuations.

With these and other objects in view, the invention consists in the method and construction as hereinafter set forth.

The invention makes use of the variations in the electrical conductivity of the liquid due to variations in its temperature. Since the electrical conductivity of the liquid is a simultaneous function of its temperature any device which is able to note variations in the electrical conductivity of the liquid directly notes the temperature changes therein, provided no other physical characteristics affecting its conductivity, except its temperature, are changing. Again, since the change in temperature of the liquid is the result of differences between the energy put into it by the heating agency and the heat lost by conduction and radiation of heat or supplied by the bath to colder materials added to it, if the device, in noting temperature changes in the manner noted above, is adapted to selectively controlling the energy input in accordance with the proper interpretation of such indicated changes, it is also adapted to controlling the temperature of the liquid or bath. If, furthermore, the device is adapted for effecting the addition of an amount of energy to the liquid correctly proportional to the addition of a predetermined amount of cold material to the same, it will be able to anticipate and prevent or minimize any change in temperature in the bath which would occur were the addition of the cold material made without simultaneously adding this proper amount of energy.

With these considerations in mind, I have devised an apparatus constructed and organized as follows.

Figure 1:
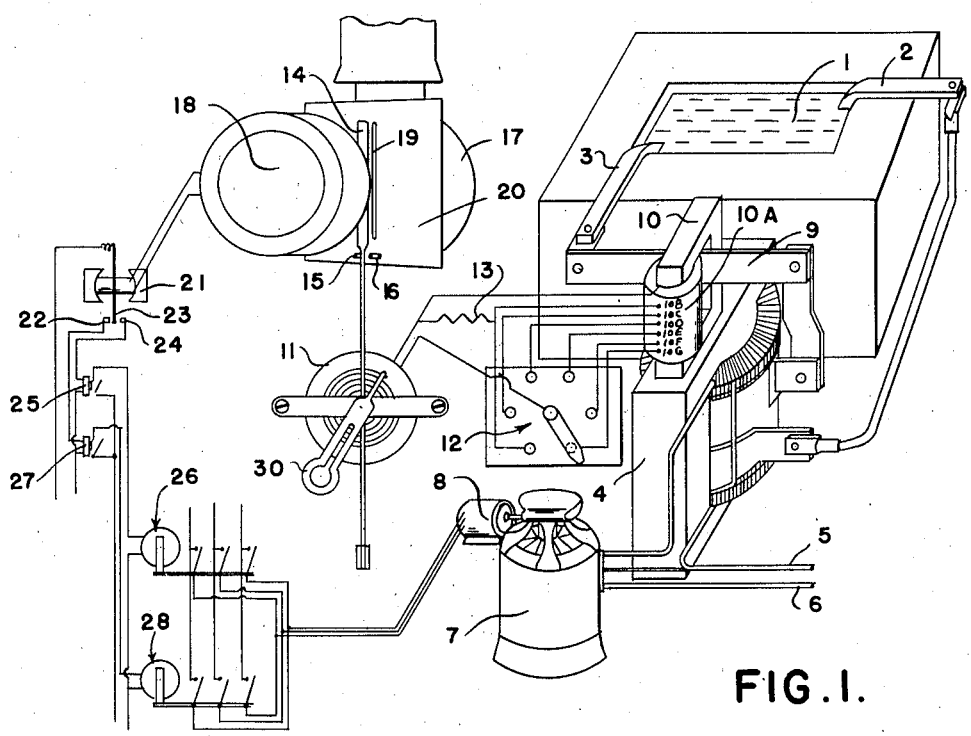
Figure 1 is a diagrammatic view illustrating an electrically heated bath and my improved means for controlling the temperature thereof.

As shown in Figure 1, 1 is the liquid bath heated by electric current passing through it between the electrodes 2 and 3, which are connected in series with the secondary winding of the transformer 4 supplied with energy from power lines 5 and 6 connected to its primary winding through a voltage regulator 7 operated by the reversible motor 8. This motor driven regulator 7 controls the energy input into bath 1 by controlling the primary voltage of transformer 4. The secondary current in the bus bar 9, which is the current passing through the bath, is linked with a magnetic circuit of a series-transformer (or current-transformer as it is usually spoken of) 10 by having the bus bar 9 pass through the window or opening in the iron circuit of the transformer. The secondary winding 10a of the current transformer 10 has a series of taps 10b, 10c, etc., at different numbered turns, and is connected in series with the coil of ammeter 11 (which has a spring tension adjustment lever 30) through a tap changing switch 12. Thus, the current through bath 1 is proportional to the current through ammeter 11 in a proportionality determined by the setting of the tap changing switch 12. Resistance 13 prevents open circuiting of the secondary winding of the current-transformer 10, during the operation of changing the setting of tap changing switch 12.

A shield 14 of the movable needle of the meter 11 is limited in its swing by the stops 15 and 16, so that its swing to the right for lower values of current limited by stop 16, can be no greater than just enough to allow light from a light source 17 to impinge on a photo-electric cell 18 through the full width of a slot 19 in a screen 20. This limit is necessary to prevent momentum being given to the needle by useless wide swings to the right during tap changing operations, since the maximum useful effect of any swing to the right, is obtained when the whole width of the slot 19 is uncovered to the photo-electric cell 18 by the shield 14. The swing of the needle to the left is limited by stop 15, so that for higher values of current the slot 19 is completely covered by the shield 14. This limit is necessary because wider swings than this, would again uncover the slot and expose to the photo-electric cell the same light conditions as obtained by too low current values. For varying values of current various amounts of light from light source 17 will impinge on photo-electric cell 18 as the shield uncovers to it, various widths of light slot 19 in accordance with the movements of the ammeter needle corresponding to the various current values.

The electric output from the photo-electric cell 18 flows through the sensitive relay 21. Low values of light on cell 18 result in low electric outputs from it, and when this output is low enough the contacts 24 and 23 of the sensitive relay 21 are closed, while high enough values of light on the cell will result in the closing of contacts 23 and 22 of the sensitive relay, because the output of the cell 18 for these higher light values, will move contact 23 away from 24 and toward 22.

If the current through bath 1 be high enough so that with a given setting of the tap changing switch 12 and of meter spring adjustment lever 30 the shield 14 covers enough of the slot 19 to cause contacts 23 and 24 of sensitive relay 21 to close, the closing of these contacts will operate the relay 25, which will close a switch 26 causing the motor 8 to move regulator 7, so as to lower the primary voltage of transformer 4, and thus lower the value of the current in bath 1. This lowering will persist till the value of the current in bath 1 falls to such a point as to move shield 14 to the right enough to clear enough of slot 19 and to allow enough light from source 17 to impinge on photo-electric cell 18 to sufficiently increase its output so as to move contact 23 away from contact 24 and thereby stop the motor 8. Similarly a sufficiently low value of current in bath 1 with the same (or other) setting of tap switch 12 and spring adjustment 30, would result in the closing of contacts 22 and 23; the operation of a relay 27 and switch 28, thereby causing the running of the motor 8 in reverse direction. This will move regulator 7 so as to raise the primary voltage of transformer 4 till the value of current through the bath 1 becomes sufficient to cause, through the means above described, the stopping of motor 8.

Thus, the apparatus is seen to hold, for any given setting of tap switch 12 and spring tension lever 30, the value of current in bath 1 within upper and lower limiting values determined by the responsiveness of meter 11, the sensitivity of relay 21 with respect to the output of cell 18, and the intensity of light source 17, as well as its distance from light cell 18. Since these factors are adjustable and not subject to change due to natural causes, the combination may be said to be an accurate device for regulating a constant current through bath 1.

The electrical conductivity of the bath depends on its temperature, but whatever this is, in accordance with the operation of this control as just described, the regulator 7 will be so adjusted automatically as to make the transformer 4 supply sufficient voltage to pass through the bath just that value of current required in accordance with the setting of tap switch 12 and lever 30. This value of current multiplied by the value of voltage supplied to produce it, will be the amount of energy supplied to the bath. If this amount of energy is just equal to the heat losses from the bath, then the temperature of the bath will not change. If, however, this input be greater than the losses, the temperature of the bath will rise; its conductivity increase; and the control apparatus will automatically reduce the voltage to keep the current value substantially constant. Thus, the input of energy will be lessened, but at the same time, due to the increased temperature the heat losses are greater. As the temperature increases adjustments of voltage will be automatically made lower until a condition of equilibrium is soon reached, where the lessened input equals the increased loss and a stable temperature is attained. In a like manner, if the input at first were less than the losses, the temperature would fall; the conductivity would be less; the voltage would be raised to maintain the current value; the input thereby increased, and the process would continue till the increased input equaled the lessened losses and equilibrium of temperature attained.

Thus, it is seen that this apparatus by reason of its being a constant current regulator, is a temperature regulator for the bath. For every setting of the tap changing switch 12 and the spring tension lever 30, there is a corresponding temperature to which the bath will be automatically brought. This depends on there being no physical changes in the bath nor in its relation to losses by conduction or radiation, factors which have to do only with the construction and maintenance of the furnace and nothing to do with the design of the control as such.

The addition of cold material to the bath will lower its temperature, resulting in the automatic control functioning as explained to bring the temperature back to the value called for by the setting of the switch 12. The voltage would be raised due to the lowered bath temperature and conductivity, in the proper amount, and for a long enough time to supply just that amount of heat taken from the bath by the cold added material. However, such a cycle of operations would take time in making the complete adjustment, but if at the time the material were added, the setting of tap switch 12 were changed so as to increase the value of the bath current and this changed setting were maintained for the proper length of time, the correct amount of energy would be added to the bath to supply the heat required by the added material to bring it to the bath temperature, and this without any delay due to waiting for the automatic temperature adjustment to be made by the control. In the salt bath method of heating material the flow of heat into the added material from the molten salt is very rapid and a piece of metal would arrive at the same temperature as the bath in which it is immersed sooner than this temperature could be automatically adjusted to its proper value after the lowering of the same by the addition of the cold material. And since the amount of the added energy in this operation is equal to the added rate of energy flow as represented by the increase in the setting of tap switch 12 multiplied by the length of time such increase in setting is maintained, it will be seen that if the time interval be fixed, then the added setting on switch 12 should be so much per pound of material added (dependent on the specific heat of the material and the increase in temperature given to it) while if the added setting on switch 12 be fixed, then the time interval of the duration of this setting will be so many seconds per pound of material, or a combination of these two methods may be used.

If material be added to the bath and then, when up to bath temperature or any approximation thereto, as in heat treating metals, it is removed; and if during this time the added energy were put into the bath in accordance with the method just described, then when the setting of switch 12 has been returned to the original temperature-holding setting after the added setting has been allowed to run out its allotted time interval any attempt by the automatic control to make a voltage adjustment by means of a change in the setting of regulator 7 from what it was, to maintain the original temperature-holding current, will serve to indicate to the operator that his addition of energy was not in the proper amount. If the automatic control upon the re-establishment of the original setting of switch 12 moves regulator 7, so as to afford a higher primary voltage for transformer 4 than it did before the metal was introduced into the bath, such action indicates to the operator that the bath temperature has fallen because he made too little energy addition, while if the automatic control makes such a change in the opposite direction he may assume his energy addition was too great. These energy additions are determined by experiment as to the value per pound and necessary variations from established practice are thus always indicated to the operator.

Figure 2:
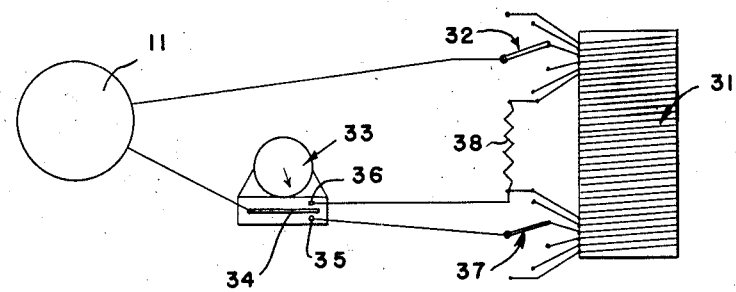
Figure 2 is a diagrammatic view showing a modification of the controlling means.

For convenience in operation during such processes the arrangement in Figure 2 is used. The secondary winding 31 of current-transformer shown as 10 in Figure 1 has taps at each end. The taps at one end are connected to tap changing switch 32 through which they may be selectively connected to one terminal of the ammeter 11. The other terminal of 11 is connected to the common contact 34 of the time switch 33 which switch controls the time interval during which contact 34 is held against contact 35, at the expiration of which selected interval contact 35 is moved over by the timing mechanism to make contact with contact 36. The contact 36 is connected to the pivot contact of the rotary tap changing switch 37 whose contact points are connected to the taps at the other end of the current transformer secondary winding 31 as shown. Resistance 38 is connected across the main body of the current transformer secondary winding to prevent open-circuiting of the same during tap changing or timing switch operations. The value of holding current is set on tap switch 32 since while contacts 34 and 36 are held together the end taps connected to tap switch 37 are not effective, they being not in circuit. The addition for energy to supply heat for material added to the bath is made by a setting on tap switch 37. The operator then causes time switch 33 to begin its cycle in accordance with a time decided upon as correct. This changes contact 34 from closure with 36 to closure with 35 and brings the selected end turns connected to tap switch 37 into circuit causing the automatic control to raise the energy input by the predetermined amount as required by the change in the number of effective turns in the secondary winding 31 made by putting these other end turns into circuit. At the termination of the selected time interval the contact 34 is again returned to contact with 36 and the holding temperature setting on tap switch again becomes alone effective. This arrangement facilitates operation during heat treating operations by keeping the two selected energy input settings separate so far as consideration by the operator is concerned.

The actual temperature reading of the bath itself may be taken by a suitable temperature indicating device, such as a thermal-couple within a protection tube immersed in the bath and connected to a suitably calibrated millivoltmeter, or by any other suitable means. It is to be used as a check only and not as a controlling pilot, since its action is not sensitive enough nor rapid enough when compared to the method herein described.

What I claim as my invention is:

1. The combination with a fluid bath of the type in which electrical conductivity increases with temperature, and means for supplying electrical energy thereto to internally heat the same, of means responsive to variations in current, incident to changes in the bath from a predetermined normal temperature and consequent changes in electrical conductivity for varying the voltage impressed upon the electrical energy supplying means to vary the current so as to substantially maintain the normal temperature, independent adjustment means for selectively changing the current value at which the aforesaid means is non-responsive, and automatic timing means operable on the introduction of work into the bath for first effecting said change in value and subsequently restoring the normal value, whereby the total increase of heat generating energy put into the bath is substantially equal to that absorbed by the work in raising the temperature thereof to said predetermined normal temperature.

2. The combination with an electrical furnace of the fluid bath type and means for controlling the average rate of energy input to substantially maintain the temperature of the bath at a predetermined point, of means including a timing mechanism operable upon the introduction of work into the bath and independent of any temperature changes therein for increasing the energy input rate to a degree and for a time so that the total increase in amount of energy substantially equals that absorbed by the work in raising the temperature thereof to said predetermined point.

RICHARD C. UPTON.